April 17, 1928.  E. CHECCONI  1,666,439
PERAMBULATOR
Filed April 23, 1927    2 Sheets-Sheet 1
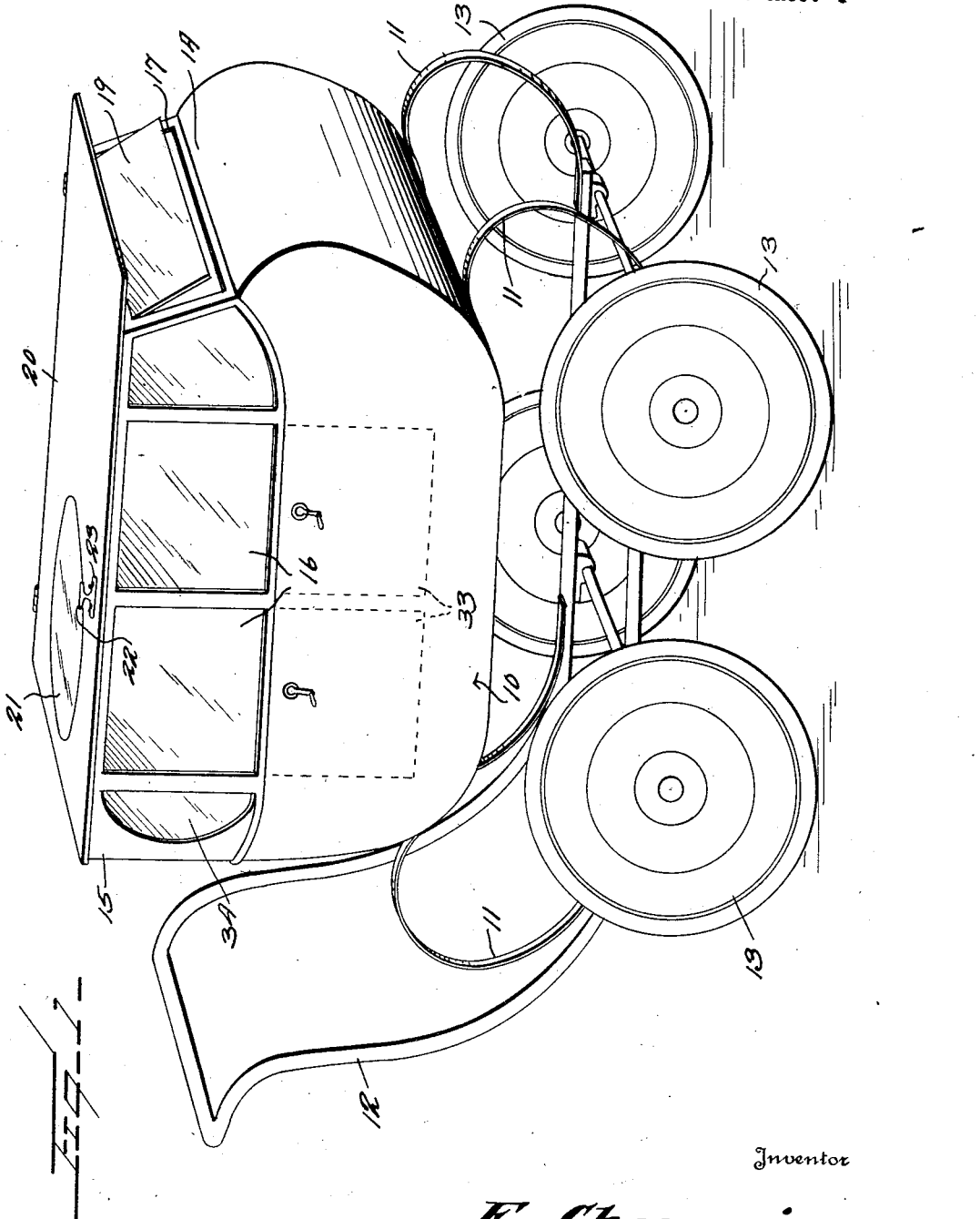
Inventor
E. Checconi
By Watson E. Coleman
Attorney April 17, 1928.  E. CHECCONI  1,666,439
PERAMBULATOR
Filed April 23, 1927   2 Sheets-Sheet 2
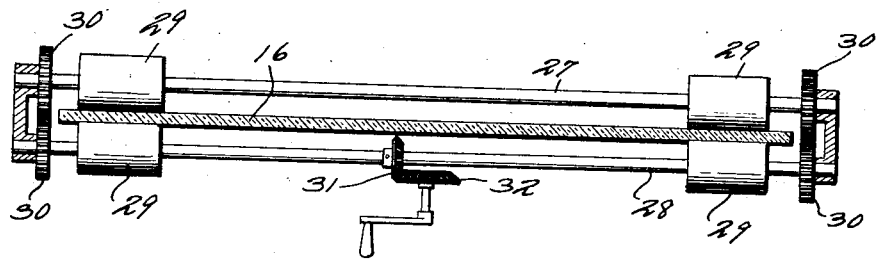
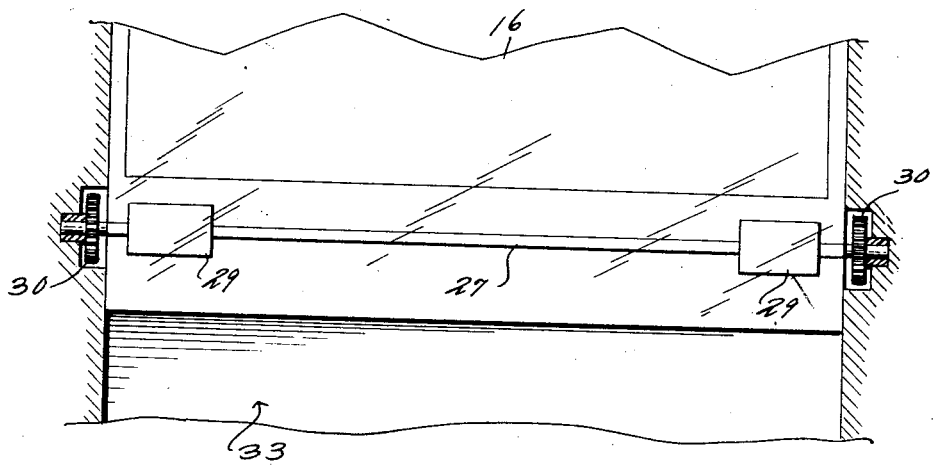
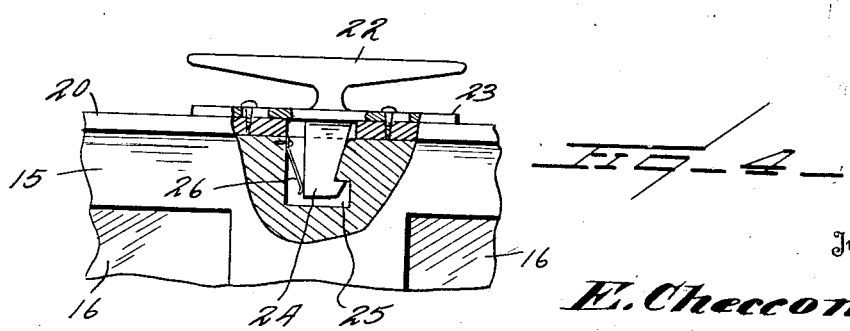
Inventor
E. Checconi
By Watson E. Coleman
Attorney Patented Apr. 17, 1928.

1,666,439

UNITED STATES PATENT OFFICE.

ELIGIO CHECCONI, OF PUEBLO, COLORADO.

PERAMBULATOR.

Application filed April 23, 1927. Serial No. 186,067.

This invention relates to baby carriages or perambulators and the general object of the invention is to provide a body for a perambulator so designed as to provide means whereby the baby may be fully protected from the weather, while at the same time adequate ventilation is provided for.

A further object is to provide a closed body for the perambulator having side windows, a front windshield and a top in the form of a lid which may be turned down over the body and locked closed, which has an opening through which the baby may be observed, the windows at the sides of the body being provided with means whereby they may be readily raised or lowered.

My invention is illustrated in the accompanying drawings, wherein:—

Fig. 1 is a perspective view of a baby carriage or perambulator constructed in accordance with my invention;

Fig. 2 is a transverse section through the window casing of the carriage and window to show the means whereby the window is raised or lowered.

Fig. 3 is a vertical sectional view of the construction shown in Figure 2;

Fig. 4 is a sectional view through the top of the carriage showing means whereby this top is locked in a closed position.

Referring to these drawings, 10 designates the body of the baby carriage or perambulator which is to be mounted upon springs 11 of a wheeled frame in any suitable manner, this wheeled frame being provided with the usual handle 12 whereby the perambulator may be pushed and with the wheels 13. The body of the carriage may be made of any suitable material, but is preferably weather-proof. The front of the body extends upward and then inward as at 14. The sides 15 are provided with one or more window openings in which sliding windows 16 are mounted as will be hereafter described. Between the portion 14 and the top of the body, there is an opening 17 which may be entirely covered by a windshield 19. This windshield 19 is hingedly mounted so that it may be raised or lowered so as to control the amount of air passing in through the opening 17. Hinged to the upper edge of the body is a top 20 which projects out beyond the sides of the body and beyond the front and rear thereof, so as to form a water shed and this top 20 is provided with an opening having a pane 21 preferably disposed adjacent the rear end of the top through which the baby may be observed. The top is of course weatherproof and as above remarked, projects over beyond the front and rear sides of the body so as to form a water shed. The top is held closed by a latch comprising a handle 22 having a base 23 which is slidingly mounted upon the top. This base carries a hasp 24 which projects into a recess 25 in the side wall and a spring 26 in the recess urges the hasp with the side 23 in a direction to cause the hasp to project beneath the under-cut wall at one end of the recess 25. By retracting the hasp by means of the handle 22, the top is released and may be opened.

The sliding windows 16 are each mounted between two shafts 27 and 28, these shafts being mounted in suitable bearings, and the wall of the window opening and each shaft carry a pair of rubber rollers 29 between which the window operates. Each pair of shafts is provided with intermeshing gear wheels 30 and the outer shaft is provided with a beveled gear wheel 31 intermeshing with a beveled gear wheel 32 having a crank handle. By rotating this handle, the shafts 27 and 28 are rotated in one direction or the other and thus the window is raised or lowered. The window is closed when the window is raised and when the window is lowered the pane moves into the pocket 33 formed in the side wall of the carriage.

A carriage constructed in accordance with my invention fully protects the child from the weather, while at the same time securing ample ventilation whenever desired. The top may, of course, be opened if desired and all of the windows opened and the windshield opened. On the other hand, the top may be closed, the windows more or less closed and the windshield adjusted so as to secure just the right amount of ventilation without draft. If the perambulator is used on a rainy day, the windows on the lee side of the perambulator may be opened and the windows to windward closed so that the child is fully protected from rain or snow and yet can have air, and the windshield may be entirely closed when the perambulator is being pushed into the wind. The windows are easily adjusted and held at any desired point, the baby is under constant observation through the window 21, and inasmuch as the sides may be provided with extra windows 34, the baby will have all the sunlight that may be necessary without direct glare in its eyes. Inasmuch as the top may be latched closed, it is obvious that the baby may be left in the perambulator without danger.

I claim:—

1. In a structure of the character described having a window opening, a window pane slidingly mounted in said opening, the body being provided with recesses into which said pane is disposed when the pane is lowered, and means operable from the exterior of the body whereby the pane may be raised and lowered, said means including a pair of oppositely disposed shafts on the inner and outer faces of the pane, such shafts having yielding rollers engaged with the pane, means gearing the two shafts to each other for coincident movement, and means on the exterior of the body whereby one of said shafts may be manually rotated.

2. In a carriage, a wall having a window opening, a glass pane slidingly mounted in the window opening, the wall having a recess into which said pane slides when the pane is depressed, and means for raising or lowering said pane comprising shafts disposed in opposite sides of the pane and having yielding rollers engaging the pane, intermeshing gear wheels on the shafts, a beveled gear wheel on one of said shafts, and an intermeshing beveled gear wheel having a crank handle whereby the shaft may be operated.

In testimony whereof I hereunto affix my signature.

ELIGIO CHECCONI.